Dec. 22, 1964   F. H. EMERSON   3,162,231
MECHANISM FOR AND METHOD OF EXPANDING SLITTED FOIL
Filed July 11, 1961   4 Sheets-Sheet 1
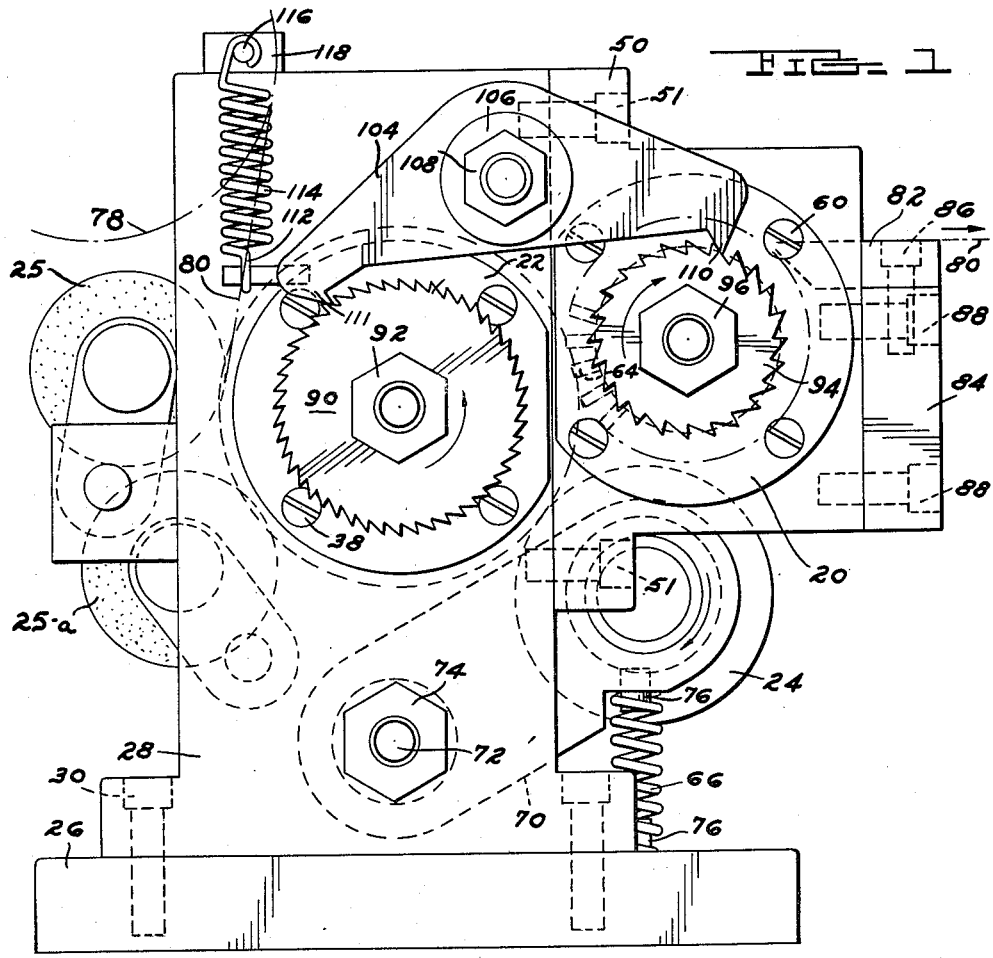
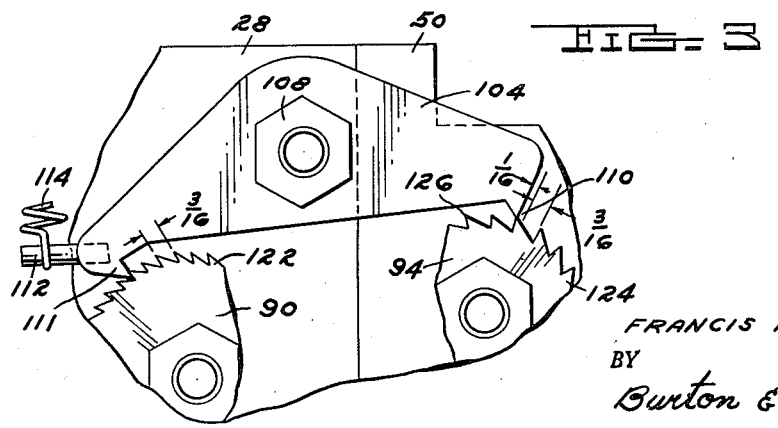
INVENTOR.
FRANCIS H. EMERSON
BY
Burton & Parker
ATTORNEYS Dec. 22, 1964  F. H. EMERSON  3,162,231
MECHANISM FOR AND METHOD OF EXPANDING SLITTED FOIL
Filed July 11, 1961  4 Sheets-Sheet 2
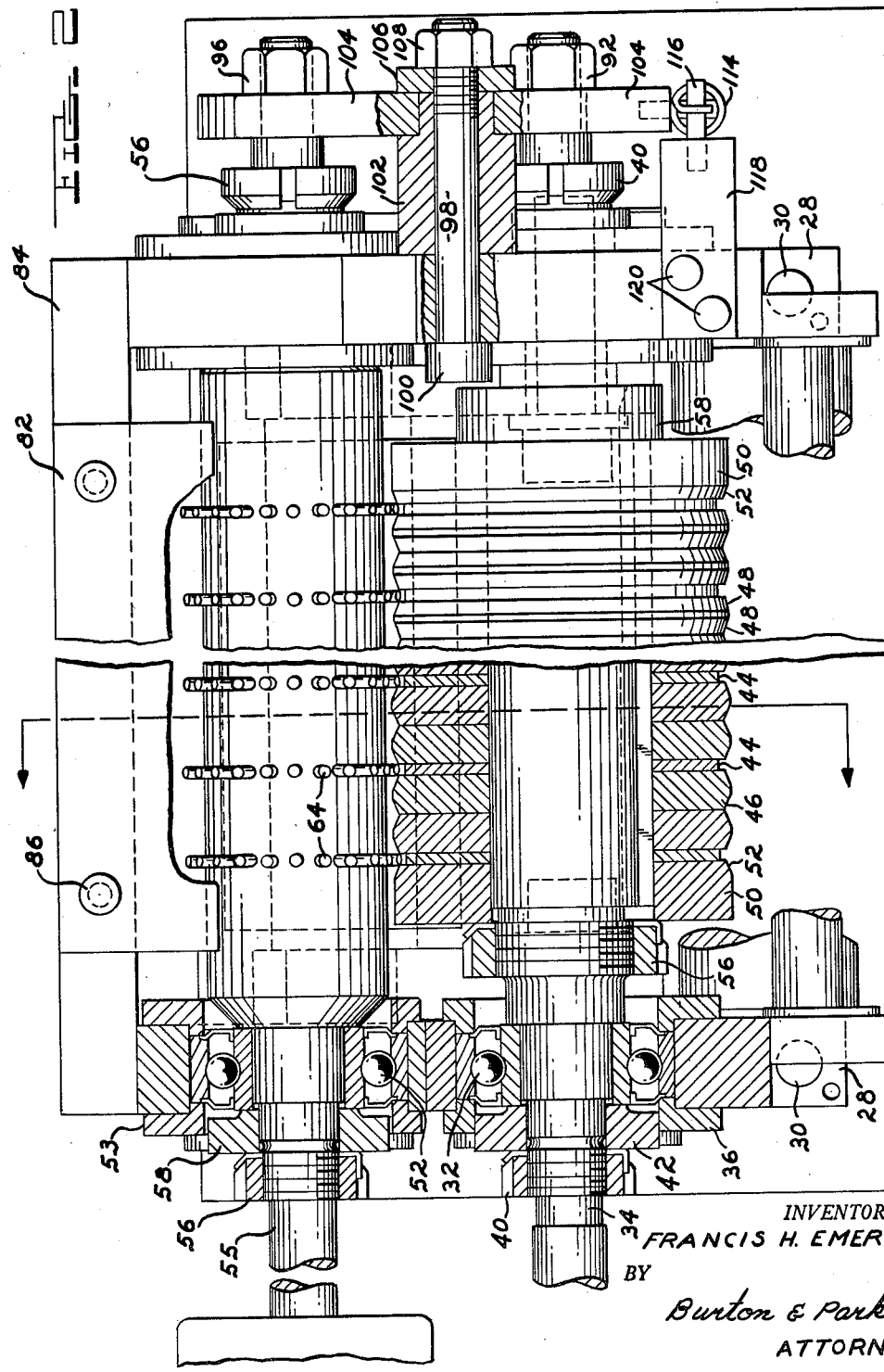
INVENTOR.
FRANCIS H. EMERSON
BY
Burton & Parker
ATTORNEYS

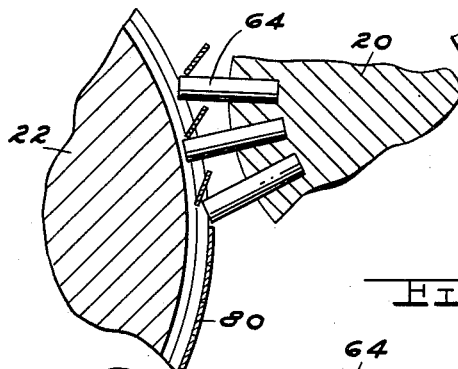
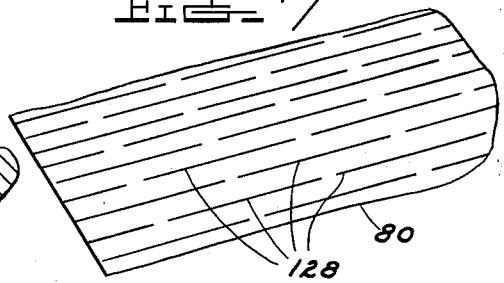
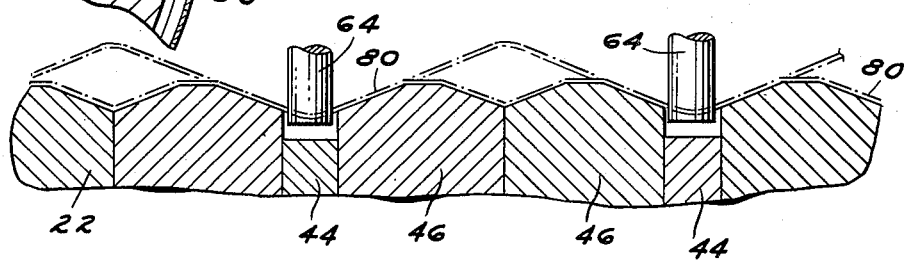
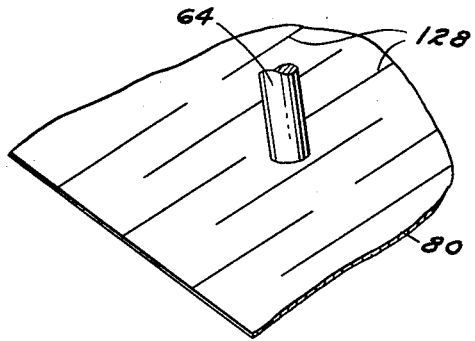
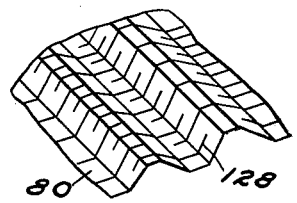
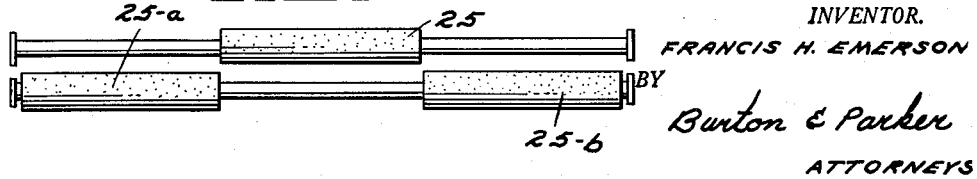
INVENTOR.
FRANCIS H. EMERSON
BY
Burton & Parker
ATTORNEYS INVENTOR.
FRANCIS H. EMERSON
BY
Burton & Parker
ATTORNEYS United States Patent Office 3,162,231
Patented Dec. 22, 1964

3,162,231
MECHANISM FOR AND METHOD OF EXPANDING
SLITTED FOIL
Francis H. Emerson, Detroit, Mich., assignor to
Edward C. Parker, Grosse Pointe, Mich.
Filed July 11, 1961, Ser. No. 123,966
14 Claims. (Cl. 153—2)

This invention relates to an improved process of and apparatus for fabricating expanded sheet metal foil out of a strip-like sheet of foil which has been previously provided with a multiplicity of spaced slits to thereafter be expanded into openings.

An object is to provide an improved process of and mechanism for expanding a slitted sheet of metal foil rapidly, economically, and accurately.

A further object is the provision of an improved process and apparatus as hereinabove set forth which is designed to provide an expanded metal foil sheet with openings of the same dimension and with the margins of the foil adjacent to the openings similarly angularly disposed.

Another object is the provision of an improved process and apparatus as heretofore set forth wherein the expansion of slitted metal foil provided in a strip-like sheet may be carried forward as a continuous process.

A meritorious feature is that by the use of my improved process and mechanism a strip-like sheet of slitted metal foil may be passed between suitable rollers provided with cooperating expanding means which means revolvably engages the foil and acts upon the same at the slits to expand such slits into openings which are of similar size and wherein the margins of the foil at the slit openings are similarly angularly disposed.

A further object is the provision of a process and mechanism adapted to function as set forth hereinabove and to accomplish the expansion of the foil without tearing or mutilating the same and wherein such expansion may be carried out as a substantially continuous process and wherein the means that acts upon the foil to produce its expansion also acts upon the foil to advance it toward completion of the fabrication.

More specifically, an object is the provision of mechanism for and a process of fabricating a slitted sheet of metal foil by passing said foil between a plurality of rollers, one of which rollers is provided with a multiplicity of pegs or points adapted to be projected into a multiplicity of slits provided in the foil to produce the desired deflection and expansion of the foil at the slits.

A meritorious feature of the structure is that the roll which is provided with the multiplicity of expanding pegs is rotatably driven and such pegs are revolvably successively projected into and through the slits in the foil. During the initial movement of the pegs into and through the foil, the foil is spread and deflected about the margins of the slits therethrough to a desired angular position, and during the continuation of the revolvable movement of the pegs they draw the slitted foil forwardly and expand the slitted openings uniformly.

An important characteristic of the process and mechanism is that following the projection of the pegs through the slits in the foil the advance of the foil is temporarily interrupted at intervals while the pegs continue their advance to complete the expansion of the slits into openings of the desired size.

Other objects and advantages will more fully appear from the following description, drawings, and claims, wherein:

FIG. 1 is an end elevation of a machine embodying my invention showing the ends of the cooperating rolls the ratchet arm and the ratchet wheels associated therewith.

FIG. 2 is a top elevation of the machine of FIG. 1 partly broken away to show the mounting for the rolls and the relationship between the peg roll and the corrugated roll.

FIG. 3 is an end elevation of a fragment of FIG. 1 showing the ratchet arm in a different position from that shown in FIG. 1.

FIG. 4 is a fragmentary sectional view through adjacent portions of the peg roll and corrugated roll showing the disposition of the pegs in contact with the sheet of foil.

FIG. 5 is a fragmentary longitudinal sectional view through the corrugated roll showing the disposition of the sheet upon the roll and the orientation of the pegs projecting through the slits in the sheet.

FIG. 6 is a fragmentary perspective view of one of the pegs initially contacting the sheet showing the deflection of the sheet upon peg contact.

FIG. 7 is a perspective view of a fragment of the slitted sheet prior to expanding of the same showing the staggered succession of slits.

FIG. 10 is a perspective of a fragment of a sheet at an intermediate stage of its fabrication.

FIG. 11 is a fragmentary plan looking down on the soft sponge rubber rolls.

Figure 8:
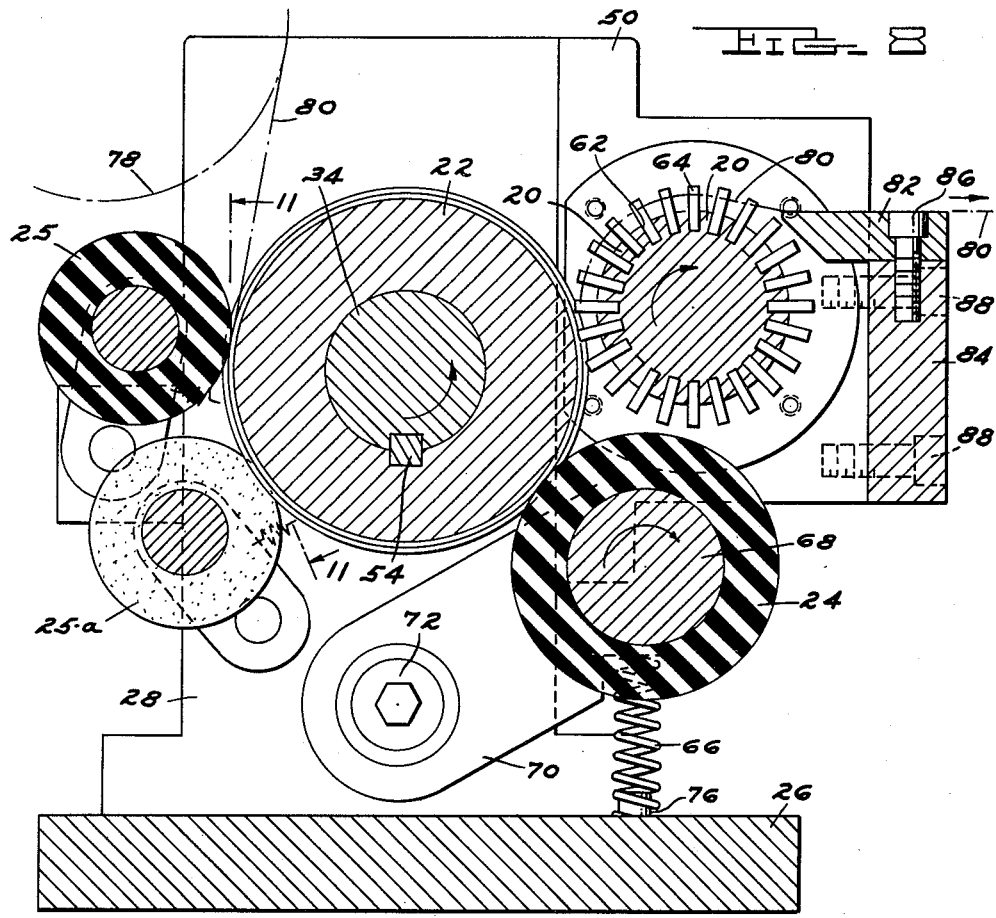
FIG. 8 is a cross-sectional view of the machine taken along line 8—8 of FIG. 2.

The apparatus employed to carry out the expanding of the slitted sheet of foil is illustrated as consisting essentially of a peg roll 20, a cooperating corrugated or grooved roll 22, and a series of pressure rolls 24, 25, 25a, and 25b. There is a foundation or base plate 26 to which a pair of opposed end plates 28 are secured as by screws 30. The end plates 28 are provided with ball-bearing shaft supporting means 32 at opposite ends for the corrugated roll and opposed ball bearings 52 for the peg roll.

The corrugated roll 22 is mounted on an axle or shaft 34 which shaft is supported in the ball-bearing means 32. Bearing retaining rings 36 are received within the end plates 28 and secured thereto by suitable screws 38. A retaining nut 40 is threadedly received on the end of the shaft 34. A cover plate 42 is supported on the shaft between the nut 40 and the ball-bearing means 32. FIG. 2 shows one end of machine broken away to show the manner in which the bearings are mounted. The opposite end of the shaft 34 is similarly supported in ball-bearing shaft supporting means carried by the end plate 28 and held by a nut 40.

The corrugated or grooved roll 22, as most clearly shown in FIG. 2, consists of a series of spacers 44 and ridged members 46. These spacer members and ridged members are arranged upon the shaft 34 as shown in FIG. 2 with spacers being disposed between alternate pairs of the ridged members. Each of the ridged members 46 has a pair of oppositely disposed bevels or chamfers 48. At each end of the roll 22 is provided an end member 50 having a chamfered surface 52 on the inwardly facing portion thereof.

The members 44, 46, and 50 comprising the corrugated roll 22 are held against rotation relative to the shaft 34 by means of a key or the like 54 (see FIG. 8). A retainer nut 56 (FIG. 2) is threadedly engaged on the shaft and is tightened against the end member 50 to hold the spacers and ridged members tightly compressed together against the shoulder 58 at the opposite end of the roll. As can be seen in FIG. 2, the spacers 44 are of a lesser outside diameter than the members 46 providing grooves between the pairs of ridged members extending circumferentially of the roll.

The peg roll 20 is provided with shaft ends 55 whereby the roll is rotatably supported to be driven by suitable driving means 19 shown schematically in FIG. 2. There are ball-bearing means 52, a ball-bearing retaining ring 53, a cover plate 58, and a nut 56 associated with this peg roll assembly as shown.

The grooves in the corrugated roll permit the pegs on the peg roll 20 to project through the slits in the sheet of foil, which slitted sheet is held bridged across the grooves, into the grooves overlying the spacers 44. The ends of the pegs project into the grooves below the adjacent edges of the chamfered faces of the members 46, as will more fully appear hereinafter. The sheet of foil bridges across the spacers to facilitate passage of the pegs through the slits. The foil following expansion may be stripped from the peg roll 20 by stripper plate 82. It may then be cut up into desired lengths.

It is understood that the metal foil strip-like sheet 80 has been previously slitted. Such foil, following slitting, may be wound upon a roll and such roll of foil may be that indicated as 78 in FIG. 8 from which slitted foil is withdrawn and inserted between the roll 22 and the series of rolls 25, 25a, and 25b and also between roll 22 and roll 24 and threaded over the pegs or points 64 on the peg roll 20.

The rolls 25, 25a, and 25b are foil corrugating rolls. Such three rolls may be disposed as shown in FIG. 8 and schematically in FIG. 11. Collectively these rolls equal the length of corrugated roll 22. These rolls are formed of sponge rubber or the like and conform to the corrugations of the corrugated roll when urged thereagainst holding the foil about said corrugations to corrugate the foil. These rolls are rotatably supported as shown in FIG. 8 and spring tensioned against the corrugated roll. Such linear corrugating of the foil reduces the width of the foil sheet. To facilitate such width reduction the sponge rubber rolls 25, 25a, and 25b may be disposed as shown in FIG. 11. Roll 25 first acts upon the foil and urges the foil along its linear center line into corrugated form, pulling the opposite linear marginal portions of the strip inwardly toward the center line. The rolls 25a and 25b then act on the linear marginal portions of the strip similarly corrugating such. By thus corrugating the strip horizontal displacement or slippage is provided for to accommodate the necessary width reduction.

It is apparent the strip of foil is first corrugated then the pins enter the slits of the corrugated sheet. A corrugated end portion of the strip has its slits threaded over the pegs. The slits of the corrugated sheet must line up with the pegs and such may be provided by manual adjustment of the strip to start. As the sheet is drawn forward by the pegs and first corrugated, such corrugation brings the slits into position to be entered by the pegs.

As the peg roll 20 is constantly driven, the foil sheet is drawn by the pegs thereof over the corrugated roll 22. It is held against the corrugated roll 22 by the pressure roll 24 and corrugating rolls 25, 25a, and 25b as heretofore described. Roll 24 is urged toward roll 22 by means of the spring 66. A fragment of a sheet of slitted foil is shown in FIG. 7. A fragment of a sheet of slitted corrugated foil is shown in FIG. 10.

In FIG. 4 the points or pegs 64 are shown entering successive slits 128 in successive rows of slits. Such is also shown in FIG. 6. As the pegs enter the slits, they spread the slits and deflect the margins of the foil adjacent to the slits entered as illustrated in FIGS. 4 and 6 so that the margins of the several slits entered by the pegs are deflected in the same direction and uniformly. In FIG. 4 the lower-most peg is shown as initiating its entry. The intermediate peg is shown as extending completely through the foil and so is the uppermost peg. In FIG. 5 the pegs are shown as extending completely through the foil, and in such figure it will appear that the pegs enter the slits overlying the grooves over the spacers 42 between adjacent pairs of ridged members 46. This appears most clearly in FIGS. 2 and 5.

Figure 9:
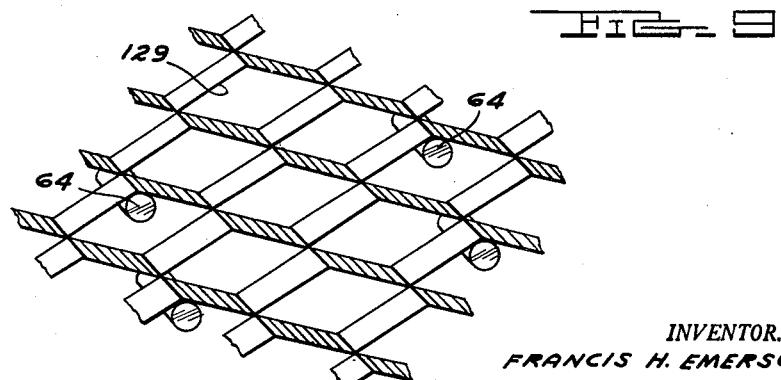
FIG. 9 is a perspective view of a fragment of the sheet following the expanding of the same and showing the engagement of the pegs with the sheet.

FIG. 9 shows pegs 64 disposed within slits which have been expanded to the desired determined area. The expanded opening are indicated as 129. It will be noted that they are uniform in size and that the marginal portions of the foil adjacent to the pegs are uniformly displaced.

The angular disposition of the foil adjacent the slit margins is not readily apparent from FIG. 9 but the foil adjacent the expanded openings is not only uniformly displaced as there shown with the openings uniform in size but the foil is uniformly deflected or angularly positioned and preferably at an angle other than a right angle with respect to the plane of the foil. Such angle is obtuse on one side and acute on the other as, for example, angles of 60° and 120°. It will be noted from FIG. 9 and it is apparent from FIG. 2 that pegs are not provided in sufficient number to enter each of the slits. It was found that if pegs were employed in every other slit of a row of slits, such would be sufficient. Pegs, of course, might be provided for each slit if desired.

In the operation of the machine as hereinbefore set forth, the peg roll, as stated, travels continuously at a desired speed. As the roll rotates, the revolving pegs enter the slits. These slits are initially spread apart and the margins thereof deflected as indicated above. Due to the action of the pegs on the foil, the slits in a transverse line with the slits entered by the pegs but in which no peg has entered are likewise distended and displaced similarly to the slits entered by the pegs. While the pegs are in the slits and after their initial entry as a result of rotation of ratchet wheels 94, the rocker arm 104, which carries the pawls 110 and 111 at opposite ends, is lifted at the end provided with pawl 110 as such pawl 110 approaches the flatted area 126 of tooth 124 as shown in FIG. 3. The pawl 111 at the opposite end of the arm 104 at this point engages a tooth 122 of ratchet wheel 90 and restrains rotation of corrugated roll 22, restraining advance of the foil sheet. The pawl 111 then enters the trough between two teeth 122. During the time the pawl 110 travels the final distance up a tooth 124 and over the flatted area 126 thereof the foil is held against advance because during such time the roll 22 is interrupted as to rotation due to interruption of rotation of its ratchet wheel 90. When the pawl 110 drops from the flatted area into the notch preceding the next tooth, the opposite end of the ratchet arm is lifted and pawl 111 releases ratchet wheel 90 to permit rotation of the corrugated roll.

During this interruption of rotation of roll 90, the foil sheet is held against advancement while the peg roll continues to rotate and the pegs in the slits expand the slits as shown in FIGS. 4 and 9 so that the expanded openings appear as in the fragment of the sheet illustrated in FIG. 9. When this point in the progress of rotation has arrived, the peg roll has rotated sufficiently so that the spring 114 causes pawl 110 to enter the trough between the teeth 124 of gear 94 and pawl 111 is lifted from between teeth 122 of ratchet gear 90 and such gear is released to permit rotation of roll 22, and the strip of foil is again drawn forward.

It will appear that the slitted foil strip is drawn forward by the pegs on the peg roll, but that this forward movement is interrupted at intervals so that the foil strip acually advances by interrupted increments of advance. During these periods of interruption, when the foil stands stationary due to interruption of rotation of roll 22, the continued revolvable movement of the pegs completes the expansion of the slits to the point shown in FIG. 9.

It is apparent that the slits may be so expanded in the foil and so dimensioned as to provide openings of desired dimension. It is also apparent that foil of different thicknesses may be provided.

What I claim is:

1. That method of fabricating an expanded sheet of metal foil comprising providing a sheet strip of foil having a multiplicity of short length slits formed transversely therein and disposed in spaced succession linearly thereof, projecting a plurality of slit engaging points into a plurality of slits and shifting said points while within the slits linearly with respect to the strip expanding the slits formed into strip linearly thereof into larger openings providing an expanded sheet of foil.

2. That method of fabricating a sheet of foil as defined in claim 1 characterized in that the slits are disposed in successive multiplicities throughout the length of the strip and successive multiplicities of points are successively projected into successive multiplicities of certain of said slits, and said multiplicities of points while received within the slits are advanced linearly with respect to the strip expanding the slits in succesisve multiplicities of slits successively linearly of the strip.

3. That method of forming an expanded metal sheet as defined in claim 2 characterized in that the slit expanding points upon entering their slits deflect the margins of the several slits in the same direction so that the expanded slit openings formed in the sheet all have their margins similarly deflected and thereafter the points are advanced expanding the slits.

4. That method of forming an expanded metal sheet as defined in claim 2 characterized in that successive multiplicities of points are revolvably projected into successive multiplicities of slits to successively act thereon to deflect the margins of the several slits in each multiplicity in the same direction and are rotatably advanced in the linear direction of the strip acting to expand the several slits.

5. That method of forming an expanded metal sheet as defined in claim 2 characterized in that successive multiplicities of points are revolvably projected into successive multiplicities of slits to successively act thereon and deflect similarly the margins of the slits, and the sheet of foil is successively linearly advanced and restrained, and during the periods of restraint of advance of the strip, the revolvable advance of said points is continued and the slits are expanded.

6. That method of fabricating an expanded sheet of metal foil comprising providing a strip-like sheet of foil provided with successive multiplicities of short length slits extending transversely of the strip, said multiplicities continuing successively throughout the length of the strip, supporting said strip for linear advance, revolvably projecting a plurality of slit expanding points into and through certain slits in each multiplicity of slits in said strip initially deflecting the margins of the several slits in the same multiplicity in the same direction, continuously revolvably shifting said points in the direction in which the strip is supported for linear advance, alternately interruptedly restraining and releasing the strip-like sheet for advance through determined successive increments of advance producing expansion of the slits through determined increments during periods of restraint of advance of the strip.

7. That method of fabricating an expanded sheet of metal foil as defined in claim 6 characterized in that prior to projecting a plurality of slit expanding points into and through said slits the strip-like sheet of foil is corrugated linearly with parallel transversely spaced corrugations and the slit expanding points are revolvably projected through determined slits into the furrows between the ridges of the corrugations to expand the slits.

8. That method of fabricating a sheet of metal foil as defined in claim 6 characterized in that the strip-like sheet of slitted foil is linearly corrugated prior to projection of the slit expanding points into the slits and such corrugating of the strip is accomplished by urging the strip against a rotatably supported circumferentially corrugated roll the sheet is supported along the line of the ridges of the corrugations with the slitted portions of the sheet overlying and bridging transversely across the furrows of the corrugations and the points are projected through their slits into the grooves between the ridges of the corrugations.

9. That method of fabricating an expanded sheet of metal foil as defined in claim 6 characterized in that the strip-like sheet of slitted foil is passed between cooperating rolls and one of said rolls is provided with a multiplicity of radially projecting slit engaging and expanding points and is constantly rotatably driven and the other roll is alternately restrained as to rotation and permitted to rotate whereby the foil is alternately restrained and permitted to advance and the points received within the slits of the strip expand the slits during periods of restraint of advance of the strip.

10. That method of fabricating an expanded sheet of metal foil as defined in claim 9 characterized in that the roll which is alternately permitted to rotate and restrained from rotation is controlled as to its rotation and restraint of rotation by mechanism responsive to the rotation of the roll provided with the points.

11. Mechanism for expanding a slitted metal foil strip sheet having short length slits extending transversely of the strip comprising, in combination, a rotatably driven peg roll provided with a multiplicity of spaced-apart slit entering pegs, a cooperating ridged roll rotatably supported spaced from the peg roll to permit a strip sheet of foil to advance linearly therebetween engaged by the two rolls, said ridged roll provided with a plurality of spaced circumferential grooves into and through which the pegs of the peg roll pass during rotation of said rolls, said pegs adapted to enter and pass through the slits of the strip as the peg roll rotates.

12. Mechanism for expanding a slitted metal foil strip sheet having linearly spaced transversely extending short length slits comprising, in combination, a rotatably driven peg roll provided with a multiplicity of spaced-apart slit entering pegs, a cooperating ridged roll rotatably supported and spaced from the peg roll to permit a sheet of foil to be advanced linearly therebetween, a pressure roll rotatably supported to urge the strip against the ridged roll, said ridged roll provided with a plurality of spaced circumferential grooves into and through which the pegs of the peg roll pass during rotation of said rolls, and means associated with the ridged roll and the peg roll automatically operable at determined intervals during rotation of the peg roll to temporarily interrupt the rotation of the ridged roll while permitting the peg roll to continue its rotation.

13. Mechanism for expanding a strip-like sheet of metal foil provided with a multiplicity of transverse slits spaced apart transversely and longitudinally of the strip comprising, in combination, a rotatably supported and driven peg roll, a rotatably supported and circumferentially ridged cooperating corrugated roll provided with a plurality of axially spaced-apart peg receiving furrows between corrugations, said ridged roll supported spaced from the peg roll to permit the foil strip to pass between the rolls engaged thereby, a rotatably supported pressure roll held yieldingly toward the corrugated roll and operable to hold a strip-like sheet of metal foil thereagainst as the foil passes between the ridged roll and the peg roll, means coupling the ridged roll and the peg roll together whereby one of said rolls is driven continuously and the other roll is successively interrupted in its rotation.

14. Mechanism for expanding a strip-like sheet of metal foil as defined in claim 16 characterized in that in addition to the rotatably supported pressure roll there is provided a series of soft deformable pressure rolls disposed and held to urge the strip-like sheet of foil against the ridged roll, said series of rolls being sufficiently deformable to cause the sheet of foil to follow the contour of the ridges of the ridged roll to form corrugations therein.

References Cited in the file of this patent
UNITED STATES PATENTS

| | | |
|---|---|---|
| 1,526,769 | Bradford | Feb. 17, 1925 |
| 2,290,608 | Evans | July 21, 1942 |